US006430008B1

(12) United States Patent
Trabert et al.

(10) Patent No.: US 6,430,008 B1
(45) Date of Patent: Aug. 6, 2002

(54) MEASUREMENT OF TAPE POSITION ERROR

(75) Inventors: Steven G. Trabert; John P. Mantey, both of Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/539,913

(22) Filed: Mar. 30, 2000

(51) Int. Cl.[7] ............................................... G11B 5/127
(52) U.S. Cl. ....................................................... 360/317
(58) Field of Search ................................. 360/313, 317, 360/318

(56) References Cited

U.S. PATENT DOCUMENTS

| 3,678,220 A | 7/1972 | Luhrs |
| 4,258,398 A | 3/1981 | Bixby et al. |
| 4,392,163 A | 7/1983 | Rijckaert et al. |
| 4,506,309 A | 9/1985 | Joannou et al. |
| 5,898,533 A | 4/1999 | Mantey et al. |
| 5,973,869 A | 10/1999 | Gillingham et al. |

FOREIGN PATENT DOCUMENTS

EP  0 420 374 A2  4/1991

*Primary Examiner*—Allen Cao
(74) *Attorney, Agent, or Firm*—Brooks & Kushman P.C.

(57) ABSTRACT

Positioning of a tape head relative to a magnetic tape may be improved through accurate measuring of magnetic tape position error. The tape head includes at least one read module having two servo read elements. A head control detects the presence of corresponding synchronization fields passing the servo read elements. The elapsed time between the detected synchronization fields is determined. Tape skew is calculated based on the elapsed time. Tape position error calculation may be further improved by including another servo read element on either a second read module or a write module. Tracking information read from two servo read elements scanning the same servo stripe is used to calculate the offset between a read module and the write module.

12 Claims, 12 Drawing Sheets

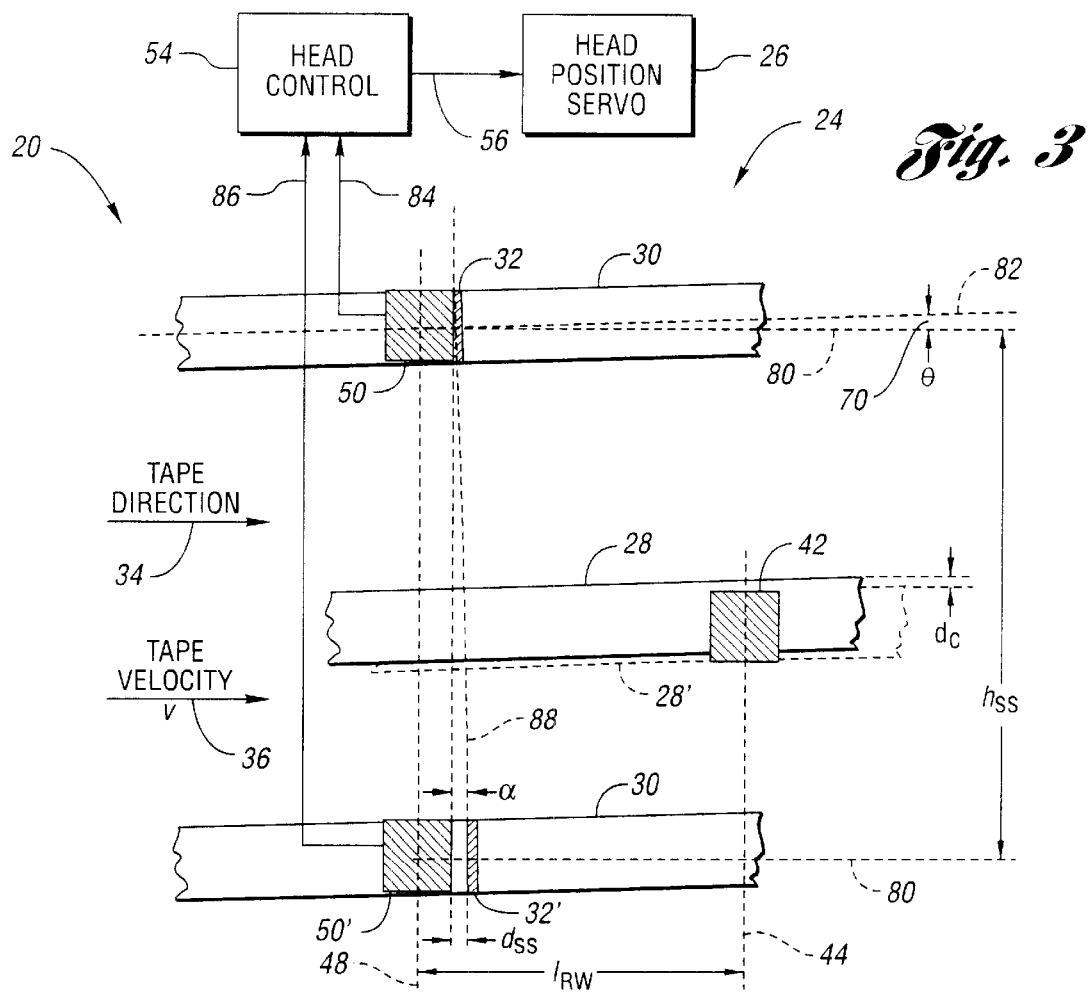
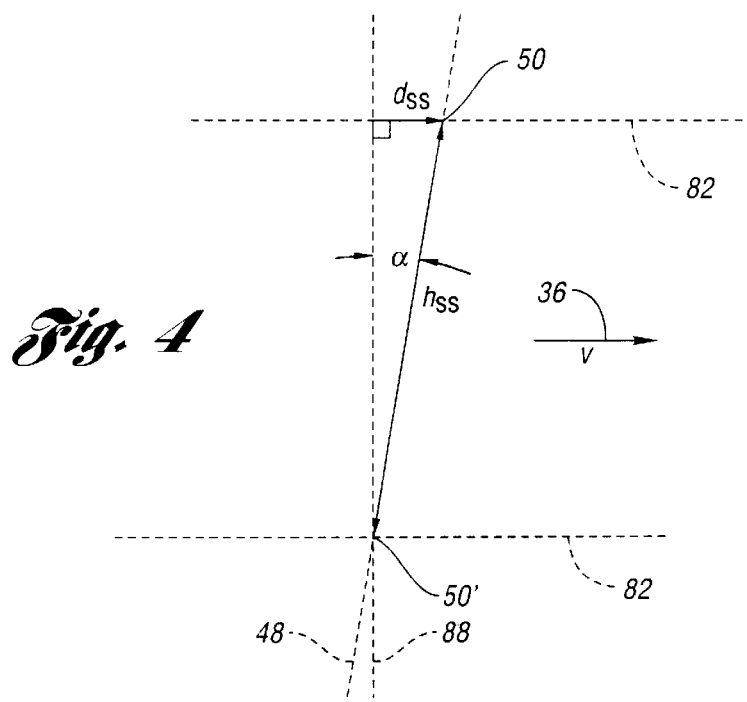

MEASUREMENT OF TAPE POSITION ERROR

TECHNICAL FIELD

The present invention relates to determining tape position error caused by tape skew and module misalignment and to repositioning the tape to minimize write element position error.

BACKGROUND ART

Magnetic tape is commonly used to store voice and data information due to its reliability, cost efficiency, and ease of use. Magnetic tape may be made more useful and cost-effective by increasing the areal density of information stored on the magnetic tape. This has generally been accomplished by including more data tracks on a given width of tape. While allowing more data to be stored, the increase in the density of data tracks requires a narrowing of the width of the data tracks, a narrowing of the spacing between data tracks, or both. As the data tracks are more closely spaced, positioning of the tape with respect to the tape head becomes more critical to reduce the possibility of errors introduced while reading or writing.

Tape heads generally include read elements for reading data from the magnetic tape and write elements for writing data to the magnetic tape. Typically, read elements may be formed in a read module with one read element for each data track that is to be simultaneously read. Similarly, write elements are manufactured into a write module, with one write element for each data track to be simultaneously written. Thin film construction techniques are used to achieve the small geometries required to produce read elements and write elements capable of accessing densely packed data tracks. Using thin film technology, spacing between read elements or write elements within a module can be preciously maintained. To permit read-after-write operation on tape moving in either tape direction over the tape head, a typical tape head may include a sandwich of one write module between two read modules.

In order to increase the accuracy of positioning the tape head relative to the tape, servo stripes or tracks may be used to provide a reference point. One or more servo stripes may be used depending upon the number of data tracks which are placed upon the tape. Servo read elements in the read modules sense tracking patterns on the servo stripe and produce signals which are received by a control system. The control system moves the head to keep the servo signals at nominal magnitude. The nominal signal occurs when the servo read element is located in a certain position relative to the servo stripe. The servo stripe may also contain features, such as synchronization fields, which indicate the beginning of a servo frame at the same location in each servo stripe across the width of the tape.

Several complications can arise that produce an error in the tape position relative to the head. First, the tape may be skewed at a skew angle relative to the tape head. Tape skew causes several difficulties. First, information written simultaneously in different tracks across the width of the magnetic tape crosses read elements and write elements at different times if the tape is skewed. Skew buffers may be required to compensate for time differences. A second difficulty results because the servo read elements are not vertically aligned with the write elements. Centering one or more servo stripes across servo read elements in a single read module will result in the data tracks not being aligned over the top of write elements due to the skew angle.

Another source of tape position error arises from the manufacture of the tape head. Within each read and write module, read and write elements can be positioned precisely relative to one another due to the accuracies permitted by thin film manufacturing processes. However, when the individual modules are assembled into the tape head, an offset may develop between modules. Such offsets introduce tape position errors. For example, an offset between a write module and a read module containing a servo read element produces a corresponding offset in the data tracks written by the write element when the tape is positioned across the read head using signals sensed from the servo stripe by the servo read element.

What is needed is a system and method for measuring tape position errors due to tape skew and module offset. The tape position error information should then be used to increase the accuracy of positioning the tape head relative to the magnetic tape.

DISCLOSURE OF INVENTION

It is a primary object of the present invention to detect and reduce tape position error in a tape deck.

Another object of the present invention is to provide for determining the skew of magnetic tape relative to servo readers.

Still another object of the present invention is to provide for positioning write elements to compensate for tape skew.

Yet another object of the present invention is to provide for determining offset between modules in a multiple module tape head.

A further object of the present invention is to provide for positioning write elements to compensate for offset between modules in a multiple module tape head.

In carrying out the above objects and other objects and features of the present invention, a system is provided for measuring position error of a magnetic tape. The tape has data tracks and servo stripes across the tape width. Each servo stripe has a periodically spaced sequence of synchronization fields and tracking patterns aligned with similar patterns in other servo stripes across the width of the tape. The system includes a multiple module tape head with at least one read module and at least one write module. A read module includes at least two servo read elements for detecting the synchronization fields. The system also includes a head control which can detect the presence of a synchronization field passing a first servo element and the presence of a corresponding synchronization field passing a second servo read element. The elapsed time between the detected synchronization fields is determined. The tape skew is found based on the determined elapsed time, the distance between the servo read elements, and the tape speed.

In an embodiment of the present invention, a second read module includes a servo read element aligned with a servo read element in the first read module such that both servo read elements read the same particular servo stripe. The head control detects a tracking pattern on the servo stripe passing the first read module servo read element and determines a first offset as the tape offset relative to the first read module servo read element. A second tracking pattern is detected from the servo stripe passing the second read module servo read element and a second offset is determined as the tape offset relative to the second read module servo read element. The offset of the second read module relative to the first read module is determined based on the skew, the first offset, and the second offset. In a refinement, the head controller estimates the offset of each write module relative to the first read module based on the determined offset between the first read module and the second read module and the distance between the first read module and the write module.

In another embodiment of the present invention, the write module includes at least one servo read element aligned with a servo read element in a read module such that both read elements read a particular servo stripe. The head control logic detects a first tracking pattern on the servo stripe passing the read module servo read element and determines a first offset as the tape offset relative to the read module servo read element. A second tracking pattern is detected on the servo stripe passing the write module servo read element and a second offset is determined as the tape offset relative to the write module servo read element. The offset of the write module relative to the read module is determined based on the skew, the first offset, and the second offset.

A tape deck for accessing a magnetic tape is also provided. The tape deck includes means for positioning the tape head across the width of the magnetic tape in response to a positioning signal. The head control generates the positioning signal based on the determined skew. In various embodiments, the positioning signal is also based on the offset between read modules or on the offset between one or more write modules and a read module.

A method for determining position error of a magnetic tape is also provided. The method includes detecting the presence of a synchronization field passing a first servo read element in a read module. The presence of a corresponding synchronization field passing a second servo read element in the read module is also detected. An elapsed time between the detected synchronization fields is determined. The tape skew is found based on the determined elapsed time and the tape speed.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 3 is a diagram illustrating skew calculation according to an embodiment of the present invention;

FIG. 4 is a diagram illustrating the trigonometric relationships associated with the tape elapsed distance;

BEST MODE FOR CARRYING OUT THE INVENTION

Figure 1:
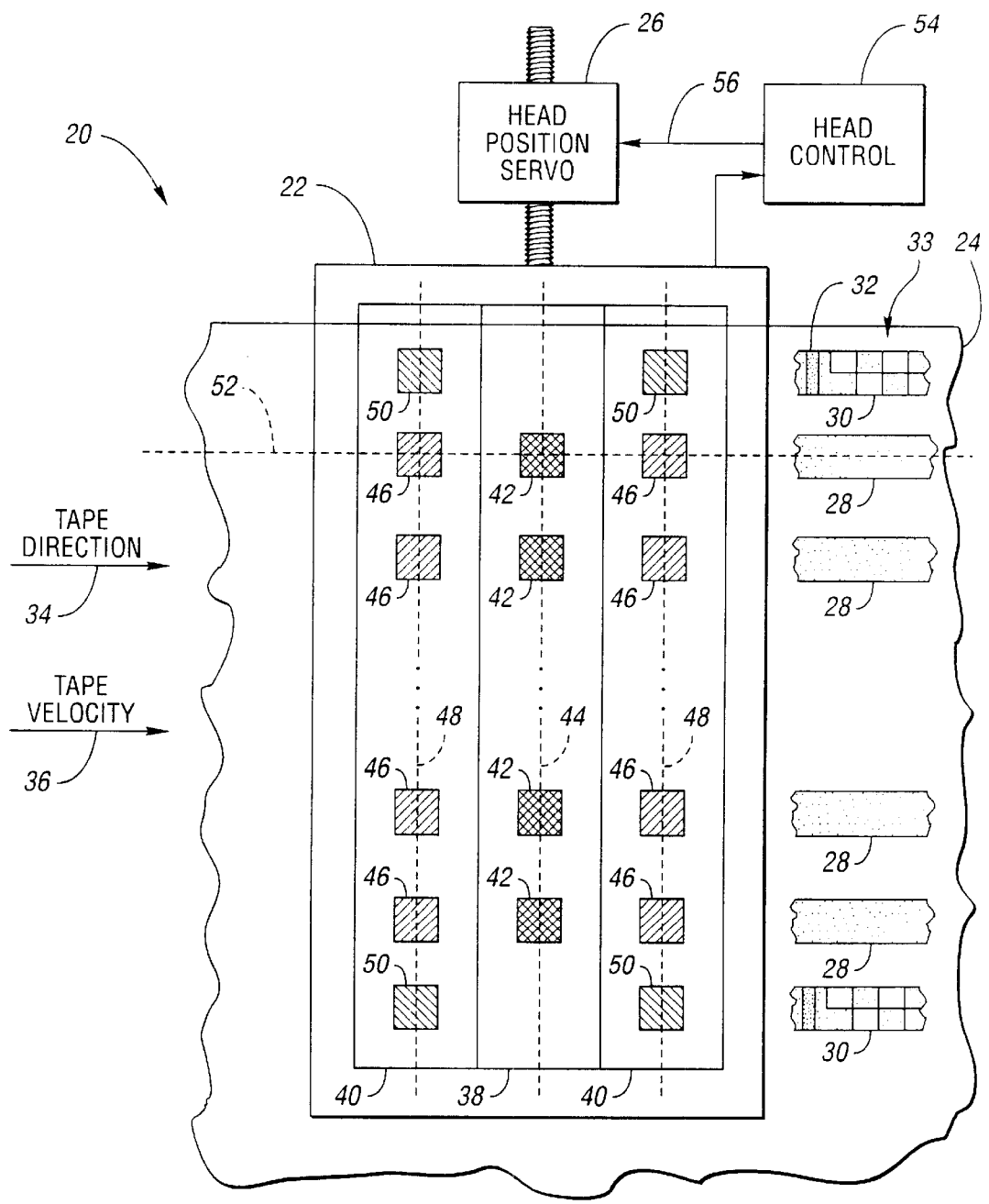
FIG. 1 is a diagram illustrating a tape with no skew traveling across a read-write-read head with no module offsets.

Referring now to FIG. 1, a diagram illustrating a tape with no skew traveling across a read-write-read head with no module offsets is shown. A tape deck, shown generally by 20, includes tape head 22 for accessing magnetic tape 24. Tape head 22 is positioned relative to tape 24 by head position servo 26.

Tape 24 includes a plurality of data tracks 28 spaced across the width of tape 24. Tape 24 also includes at least two servo stripes 30 written along the length of tape 24. Each servo stripe 30 may include periodically spaced features such as synchronization field 32 and tracking pattern 33. Tape 24 travels across tape head 22 in either tape direction 34 with tape velocity 36. Only a portion of each data track 28 and servo stripe 30 are shown and only an outline for a portion of tape 24 is provided to permit the details of tape head 22 to be seen.

Tape head 22 in FIG. 1 includes one write module 38 between two read modules 40 to form a read-write-read head. Write module 38 includes a plurality of write elements 42 constructed to lie along write element axis 44. Write elements 42 are magnetic circuits which induce field patterns in data tracks 28 as tape 24 moves past a gap in write element 42. Read module 40 is manufactured to have a plurality of read elements 46 constructed along read element axis 48. Read module 40 also includes at least two servo read elements 50 aligned with read element axis 48. Read elements 46 and servo read elements 50 sense field patterns written onto data tracks 28 and servo strips 30 respectively by detecting changes in inductance or magnetoresistance induced by the field patterns. It will be recognized by one of ordinary skill in the art that the present invention does not depend on the design and construction of write elements 42, read elements 46, or servo read elements 50.

Ideally, data track axis 52 running through the center of data track 28 is perpendicular to write element axis 44 and read element axis 48. Also, data track axis 52 passes through the center of each write element 42 and read element 46 which access data track 28.

Servo read element 50 is positioned to read tracking pattern 33 on servo stripe 30. Head control 54 in communication with each servo read element 50 detects tracking pattern 33 and determines the offset of tape 24 relative to tape head 22 in the direction normal to tape direction 34. If head control 54 detects that servo stripe 30 is not centered on servo read element 50, head control 54 generates positioning signal 56 causing head position servo 26 to move tape head 22 relative to tape 24 until servo stripe 30 is centered across servo read element 50. This centers data track 28 across write element 42 and read elements 46 operative to access data track 28.

Many tracking patterns 33 are known in the art of magnetic tape recording. One technique is to write a frequency on servo stripe 30 and erase portions of the background frequency to produce a checkerboard pattern. As tracking pattern 33 passes under servo read element 50, if servo stripe 30 is centered under servo read element 50, the strength of the background frequency signal will be at half the strength of the background signal read from servo stripe 30 not part of tracking pattern 33. If tape 24 is shifted relative to tape head 22, the background signal will be relative stronger during one portion of tracking pattern 33 and relatively weaker during another portion of tracking pattern 33. By comparing the relative strengths, the offset of servo stripe 30 relative to servo read element 50 can be determined. This technique is more fully described in U.S. Pat. No. 5,898,533 titled "Tape Servo Pattern With Embedded Servo Track Number Identification" to J. Mantey et al., which is incorporated by reference herein.

Head position servo 26 provides a means for positioning tape head 22 across the width of tape 24. Head position servo 26 may include an electric actuator, a hydraulic actuator, a pneumatic actuator, a magnetic actuator, or the like. Force may be transferred through a variety of transmission systems including gear trains, screws, levers, cabling, and belts. In a preferred embodiment, a voice coil motor is used to position tape head 22. It is understood by one of ordinary skill in the art that any means to position tape head 22 relative to tape 24 falls within the spirit and scope of the present invention.

Figure 2:
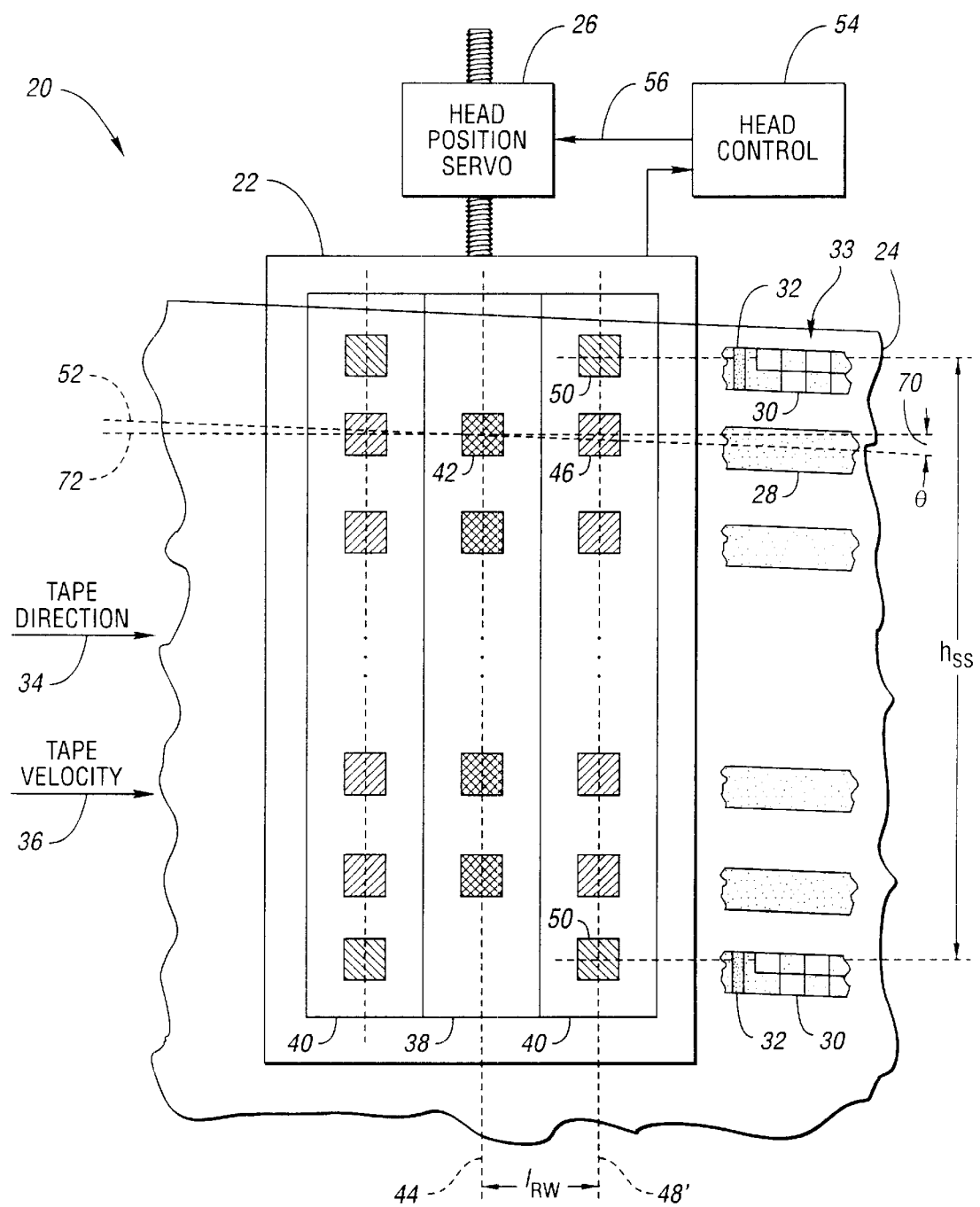
FIG. 2 is a diagram illustrating skewed tape traveling across a read-write-read head with no module offsets.

Referring now to FIG. 2, a diagram illustrating skewed tape traveling across a read-write-read head with no module offsets is shown. Tape 24 is skewed with respect to tape head 22 by skew angle θ 70. Skew angle 70 can be defined as the angle from write element normal 72 to data track axis 52. Write element normal 72 is normal to write element axis 44 and passes through the center of write element 42 used to write data track 28 upon which data track axis 52 is centered. As will be described below with regards to FIG. 3, skew angle 70 can be found by sensing corresponding synchronization fields 32 at two servo read elements 50 spaced apart by distance $h_{SS}$. If the distance between read element axis 48 centered on servo read element 50 and write element axis 44 centered on write element 42, indicated by $l_{RW}$, and skew angle 70 are known, tape head 22 can be positioned relative to tape 24 so that data track 28 is centered on write element 42.

Referring now to FIG. 3, a diagram illustrating skew calculation according to an embodiment of the present invention is shown. If servo stripe 30 is parallel to data track 28 and read element axis 48 is parallel to write element axis 44, skew angle 70 is also the angle from servo read element normal 80 to servo stripe axis 82. Servo read element normal 80 is aligned normal to read element axis 48 through the center of servo read element 50. Servo stripe axis 82 is aligned along the center of servo stripe 30. For the purposes of calculations that follow, skew angle 70 is positive if rotation from servo read element normal 80 to servo stripe axis 82 is counterclockwise.

Head control 54 receives first servo read signal 84 from a first servo read element 50 and receives second servo read signal 86 from a second servo read element 50'. Due to skew angle 70, the change in first servo read signal 84 due to synchronization field 32 will occur at a different time than the change in second servo read signal 86 due to the corresponding synchronization field 32'. Using logic described with regard to FIGS. 4–8 below, head control 54 determines the elapsed time, $t_{SS}$, between detecting synchronization field 32 passing a first servo read element 50 and the corresponding synchronization field 32' passing a second servo read element 50' separated by distance $h_{SS}$. Let $t_{50}$ be the time that synchronization field 32 is detected by servo reader 50 and let $t_{50'}$ be the time that synchronization field 32' is detected by servo reader 50'. The elapsed time is then given by Equation 1:

$$t_{SS} = t_{50} - t_{50'} \qquad (1)$$

The elapsed time can be multiplied by tape velocity 36, v, to give the elapsed displacement, $d_{SS}$, in a direction parallel to servo stripe axis 82, between synchronization fields 32,32' received by servo read elements 50,50', as given by Equation 2:

$$d_{SS} = t_{SS} \times v \qquad (2)$$

In a preferred embodiment, synchronization fields 32 and 32' are aligned normal to servo stripe axis 82. Since $d_{SS}$ is parallel to servo stripe axis 82 and synchronization fields 32,32' are aligned normal to servo stripe axis 82, $h_{SS}$ is the hypotenuse of a right triangle. The angle α can thus be found using Equation 3:

$$\sin\alpha = \frac{d_{SS}}{h_{SS}} \qquad (3)$$

Referring now to FIG. 4 with continued reference to FIG. 3, the trigonometric relationships associated with the tape elapsed distance are shown. The angle α is from read element axis 48 to synchronization field axis 88 between common points on servo stripes 30. The angle α is positive if rotation from read element axis 48 to synchronization field axis 88 is counterclockwise. Note that $t_{SS}$ and v can each be positive or negative. Thus, $d_{SS}$ and α can be of either sign in accordance with Equations 1 through 3.

Since servo strip 30 is parallel to data track 28, read element axis 48 is parallel to write element axis 44 and synchronization field axis 88 is perpendicular to servo stripe 30. Hence, angle α is equal to skew angle θ 70. Further, since skew angle 70 is generally very small, skew angle 70 can be approximated as in Equation 4:

$$\theta \approx \frac{d_{SS}}{h_{SS}} = \sin\theta \qquad (4)$$

Figure 5:
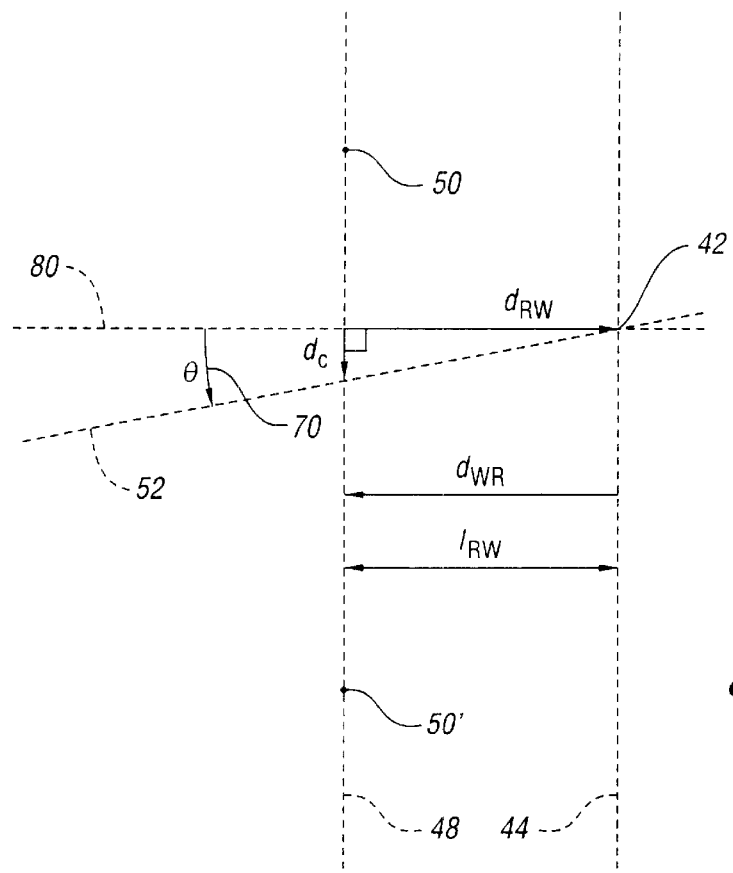
FIG. 5 is a diagram illustrating the trigonometric relationships associated with the skew angle.

Referring now to FIG. 5 with continued reference to FIG. 3, the trigonometric relationships associated with the skew angle are shown. If servo stripe 30 is centered on servo read element 50 and tape 24 has skew angle 70 relative to tape head 22, data track 28 will not be centered on write element 42. An offset distance, $d_C$, indicates the distance tape head 22 should be moved in a direction parallel with write element axis 44 in order to center data track 28 over write element 42, as shown by 28'. Knowing the displacement $d_{WR}$ from write element axis 44 to read element axis 48 of left read module 40, the correction displacement $d_C$ can be calculated as in Equation 5:

$$d_C = d_{WR} \tan\theta \approx d_{WR}\theta \qquad (5)$$

where $d_{WR}$ is negative as shown, and thus equal to $-l_{RW}$ for the illustrated example. As shown in FIG. 5, skew angle 70 is positive and offset distance $d_C$ is negative, indicating that tape head 22 should be lowered to align write element 42 over data track 28 as shown by 28'.

Combining Equations 1 through 5, the offset $d_C$ can be expressed as Equation 6:

$$d_C \approx \frac{d_{WR}}{h_{SS}} \cdot v \cdot (t_{50} - t_{50'}) \quad (6)$$

It should be noted that Equations 1 through 6 hold for positive or negative velocities. This means that, with the proper sign for $d_{WR}$, read elements 46 that either lead or follow write elements 42 may be used to compute the offset distance.

Figure 6:
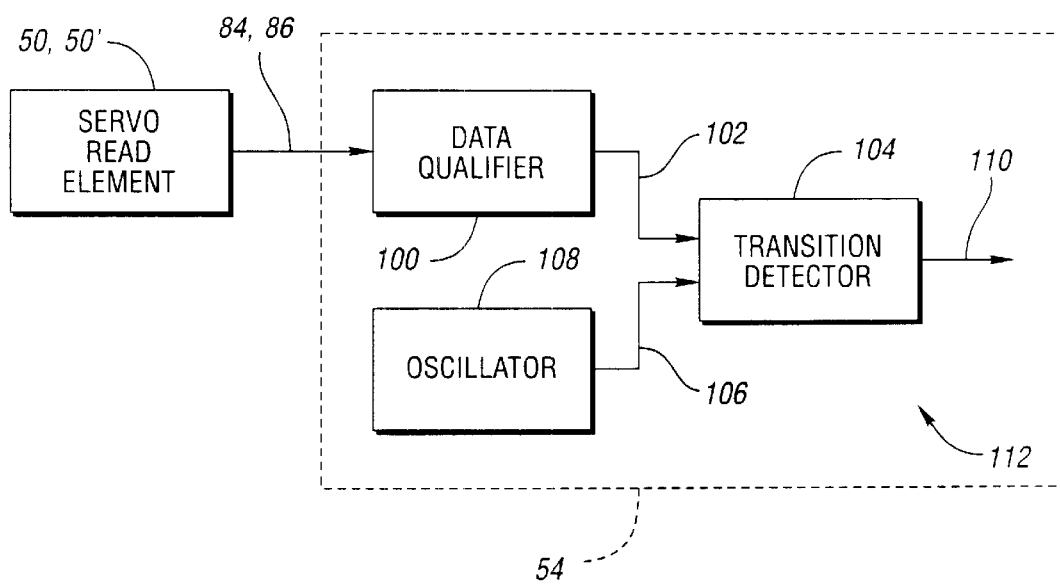
FIG. 6 is a block diagram of a system for determining the start of a synchronization field on a servo stripe according to an embodiment of the present invention.

Referring now to FIG. 6, a block diagram of a system for determining the start of a synchronization field on a servo stripe according to an embodiment of the present invention is shown. Head control 54 includes data qualifier 100 which receives servo read signal 84,86 from servo read element 50,50'. The output of data qualifier 100, discrete signal 102, is a square wave having a period equal to the period of sinusoidal servo read signal 84,86. Data qualifier 100 may also be referred to as a zero crossing detector as is known in the art of data read channels. Transition detector 104 accepts discrete signal 102 and clock signal 106 from oscillator 108 and produces transition signal 110. Transition signal 110 is a short pulse indicating that the front edge of synchronization field 32 has been received by servo read element 50,50'. Data qualifier 100, transition detector 104, and oscillator 108 are collectively referred to as pulse circuit 112.

Figure 7:
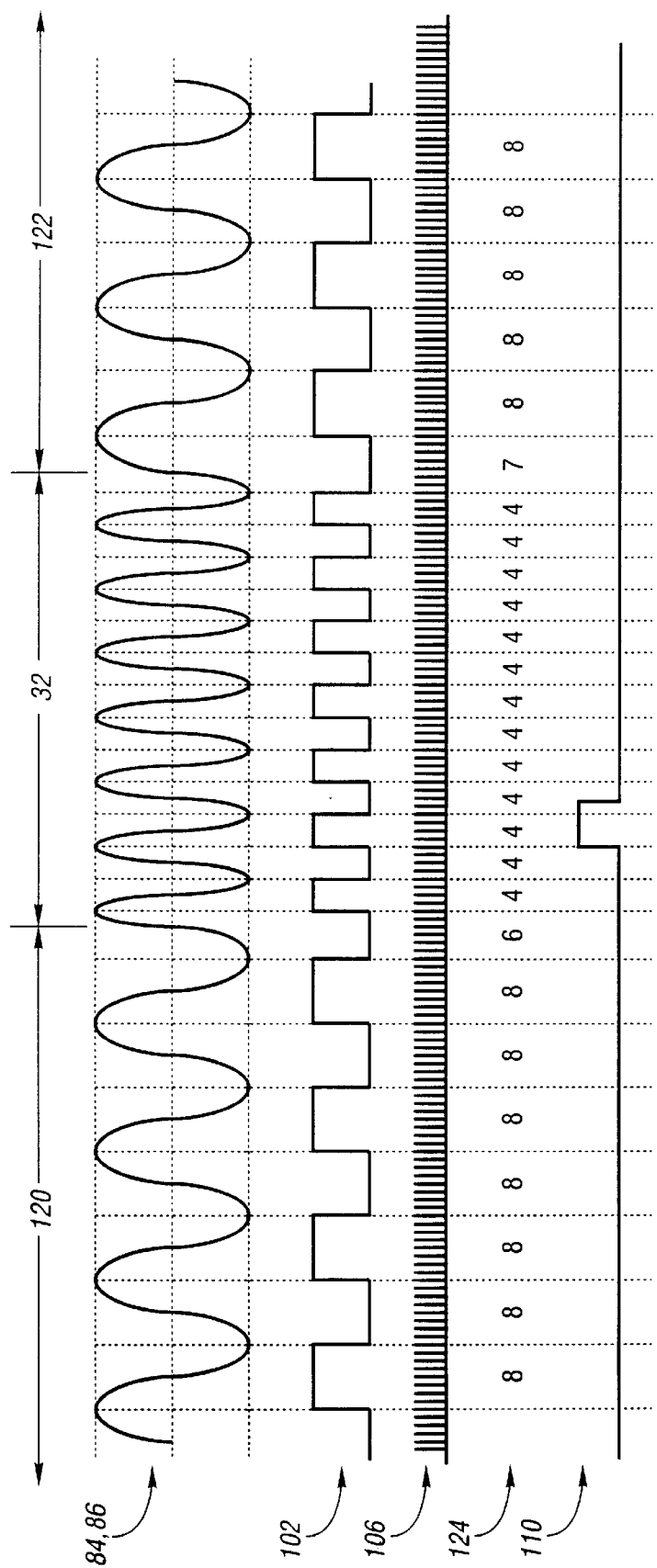
FIG. 7 is a signal diagram illustrating signals associated with synchronization field detection according to an embodiment of the present invention.

Referring now to FIG. 7, a signal diagram illustrating signals associated with synchronization field detection according to an embodiment of the present invention is shown. With continuing reference to FIG. 6, the operation of pulse circuit 112 will be further described.

Servo read signal 84,86 is a sinusoid at a first frequency when servo read element 50,50' is in region 120 just prior to synchronization field 32 and region 122 just after synchronization field 32. Synchronization field 32 produces a second frequency sinusoid, shown in FIG. 5 as having a frequency twice as large as the signals produced by regions 120,122. Data qualifier 100 generates discrete signal 102. Discrete signal 102 is a binary signal having two transitions for each period in servo read signal 84,86. Transition detector 104 includes a counter which counts periods of clock signal 106 occurring between adjacent transitions of discrete signal 102, indicated by counter value 124. Transition detector 104 outputs a pulse on transition signal 110 when a sequence of counter values 124 falls beneath a threshold. For the example shown in FIG. 5, each period of servo read signal 84,86 resulting from synchronization field 32 is eight periods of clock signal 106 and each period of servo read signal 84,86 in regions 120,122 adjacent to synchronization field 32 has a period corresponding to a value of sixteen for counter value 124. Transition detector 104 outputs a pulse on transition signal 110 following the third consecutive value for counter value 124 that is less than five. The operation of pulse circuit 112 is further described in U.S. Pat. No. 5,973,869 titled "Servo Frame Edge Detection For Tape Servo Pattern With Synchronization Field" issued on Oct. 26, 1999, to R. Gillingham, S. Trabert, and J. Mantey, which is incorporated by reference herein.

Figure 8:
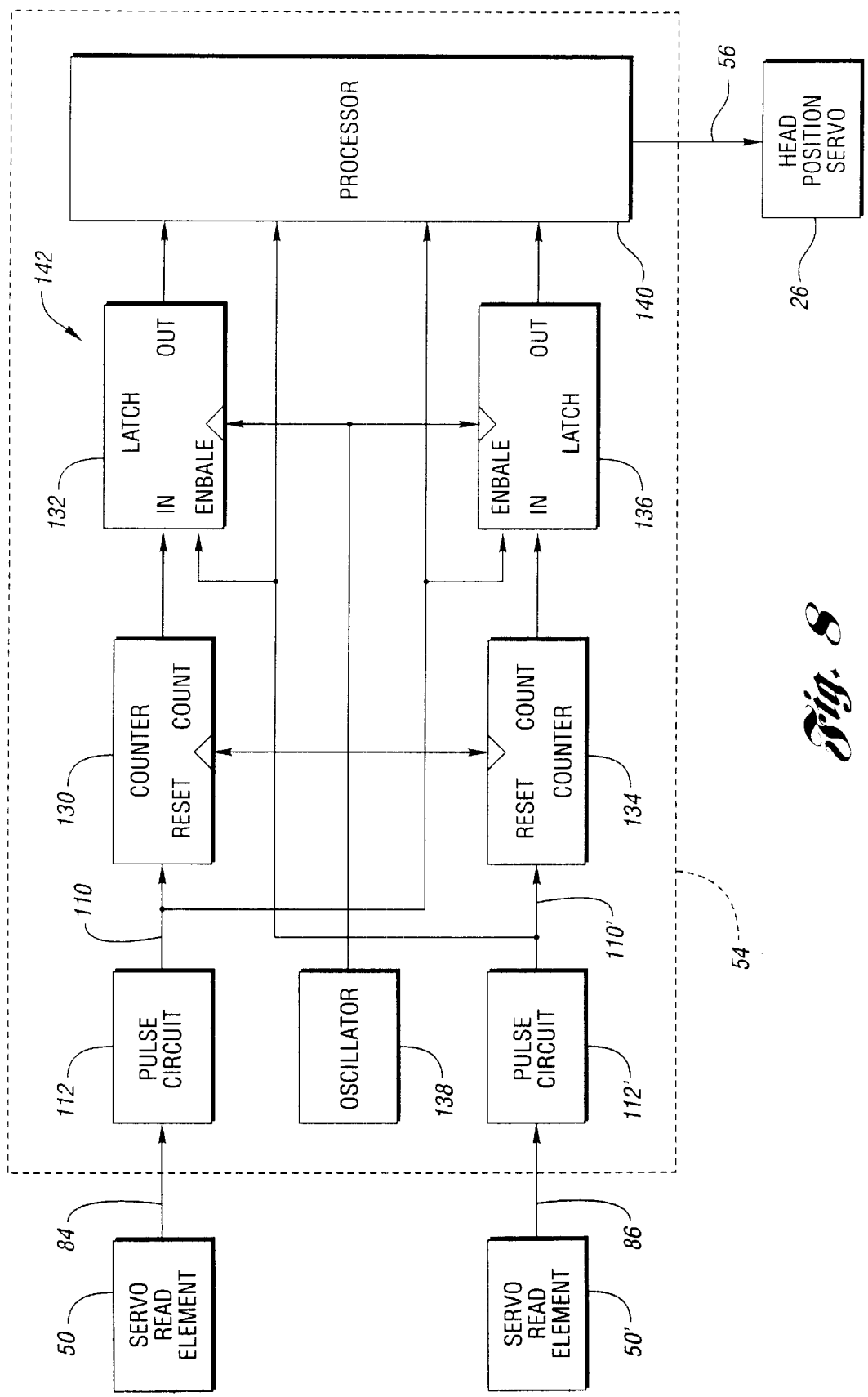
FIG. 8 is a block diagram of a system for determining tape skew according to an embodiment of the present invention.

Referring now to FIG. 8, a block diagram of a system for determining tape skew according to an embodiment of the present invention is shown. Head control 54 includes pulse circuit 112 receiving first servo read signal 84 from first servo read element 50. Head control 54 includes pulse circuit 112' receiving second servo read signal 86 from second servo read element 50'. First counter 130 is a free-running counter with a count output that can be stored in first latch 132 when the enable input for first latch 132 is asserted. Similarly, second counter 134 is a free-running counter with a count output that can be stored in second latch 136 when the enable for second latch 136 is asserted. Counters 130,134 and latches 132,136 are clocked by oscillator 138 which may be the same as oscillator 108. Transition signal 110 from pulse circuit 112 operating on first servo read signal 84 is connected to the reset of first counter 130 and the enable of second latch 136. Similarly, transition signal 110' from pulse circuit 112' operating on second servo read signal 86 is connected to the reset of second counter 134 and the enable of first latch 132. Pulse circuits 112,112', counters 130,134, latches 132,136, and oscillator 138 comprise elapsed time circuit 142.

Processor 140 waits for an asserted pulse on both transition signals 110,110'. Processor 140 then selects the smaller value between the counts held in first latch 132 and second latch 136. This value is the number of periods produced by oscillator 138 between when each of synchronization fields 32,32' were detected by servo read elements 50. Processor 140 divides this count by the frequency of oscillator 138 to determine the magnitude of the elapsed time, $t_{SS}$. The sign of the elapsed time is determined by which latch 132,136 holds the smaller value. If latch 132 holds the smaller value, synchronization field 32 was detected by servo read element 50 before synchronization field 32 was detected by servo read element 50'. Thus, in accordance with Equation 1, $t_{SS}$ is negative. Likewise, if latch 136 holds the smaller value, then $t_{SS}$ is positive. Using the method described with regard to FIGS. 3 through 5 above, processor 140 calculates the correction distance, $d_C$. Processor 140 outputs positioning signal 56 to head position servo 26 based on correction distance $d_C$.

Figure 9:
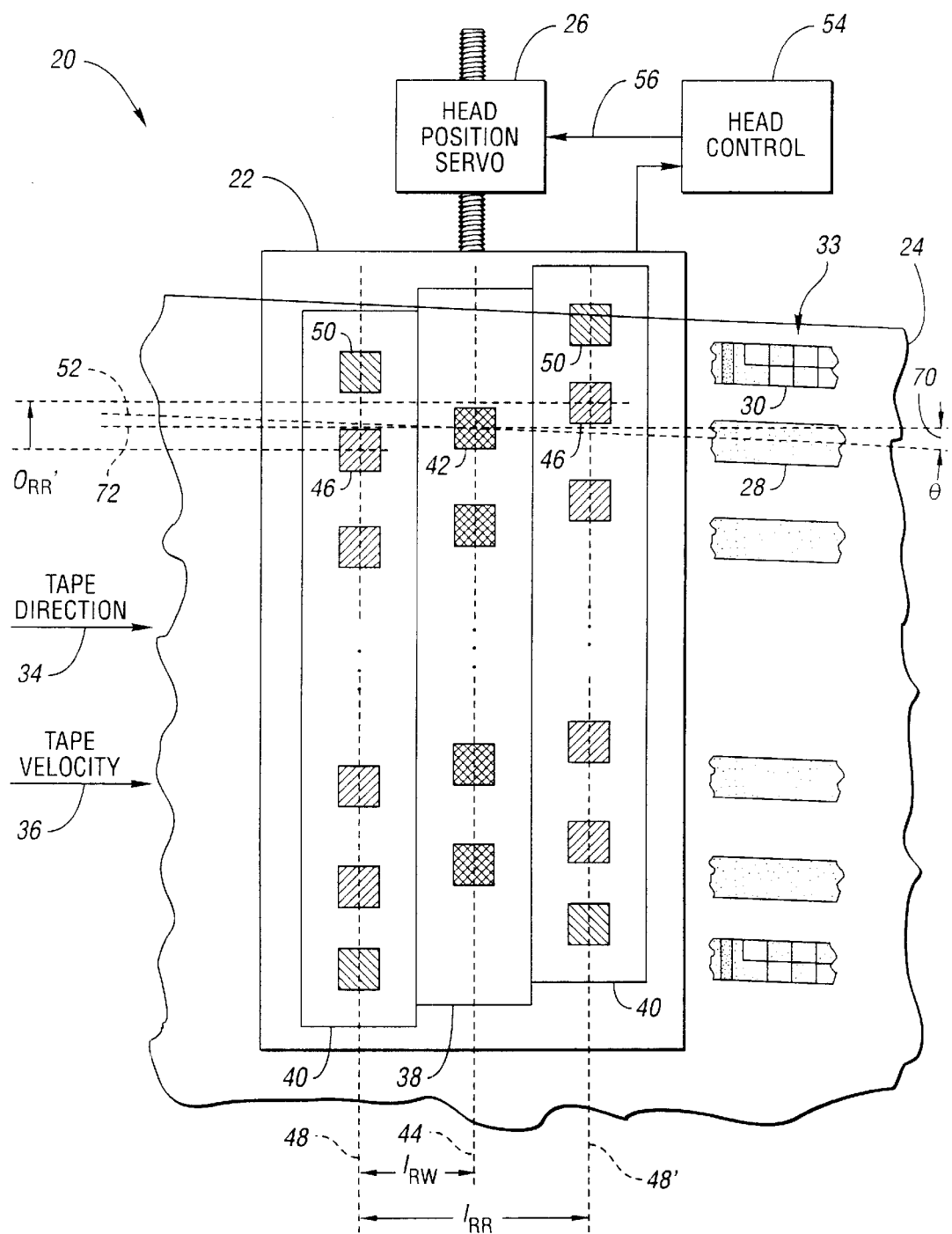
FIG. 9 is a block diagram illustrating skewed tape traveling across a read-write-read head having module offsets.

Referring now to FIG. 9, a diagram illustrating skewed tape traveling over a read-write-read head having module offsets is shown. Due to inaccuracies in manufacturing, tape head 22 may be constructed with modules 38,40 being offset from one another in a direction parallel to axes 44,48. Such an offset between two read modules 40, spaced a distance of $l_{RR'}$ in the direction of write element normal 72, is shown by displacement $o_{RR'}$. The offset between read modules 40 can be determined if skew angle 70 is known, as described with regard to FIGS. 10–12 below.

Figure 10:
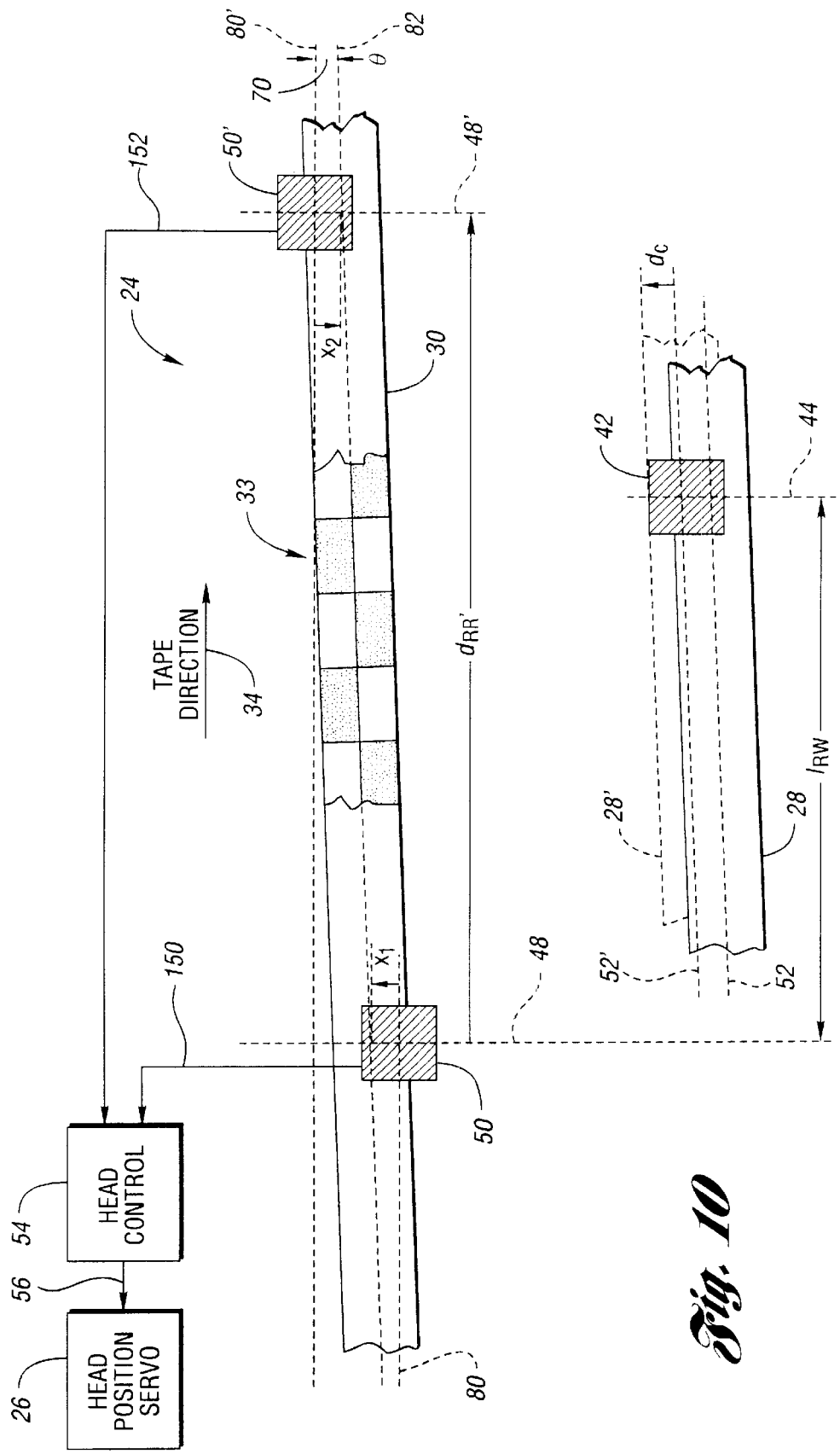
FIG. 10 is a diagram illustrating module offset calculation according to an embodiment of the present invention.

Referring now to FIG. 10, a diagram illustrating module offset calculation according to an embodiment of the present invention is shown. Head control 54 receives signals from servo read element 50 on a first read module 40 and servo read element 50' on a second read module 40'. Servo read elements 50,50' are positioned to read the same servo stripe 30. Head control 54 detects tracking pattern 33 by reading first tracking pattern signal 150 produced by servo read element 50. Based on first tracking pattern signal 150, head control 54 determines the displacement, indicated by $x_1$, from the center of servo read element 50 to servo stripe axis 82. Similarly, based on second tracking pattern signal 152, head control 54 determines the displacement, indicated by $x_2$, from the center of servo read element 50' to servo stripe axis 82.

Figure 11:
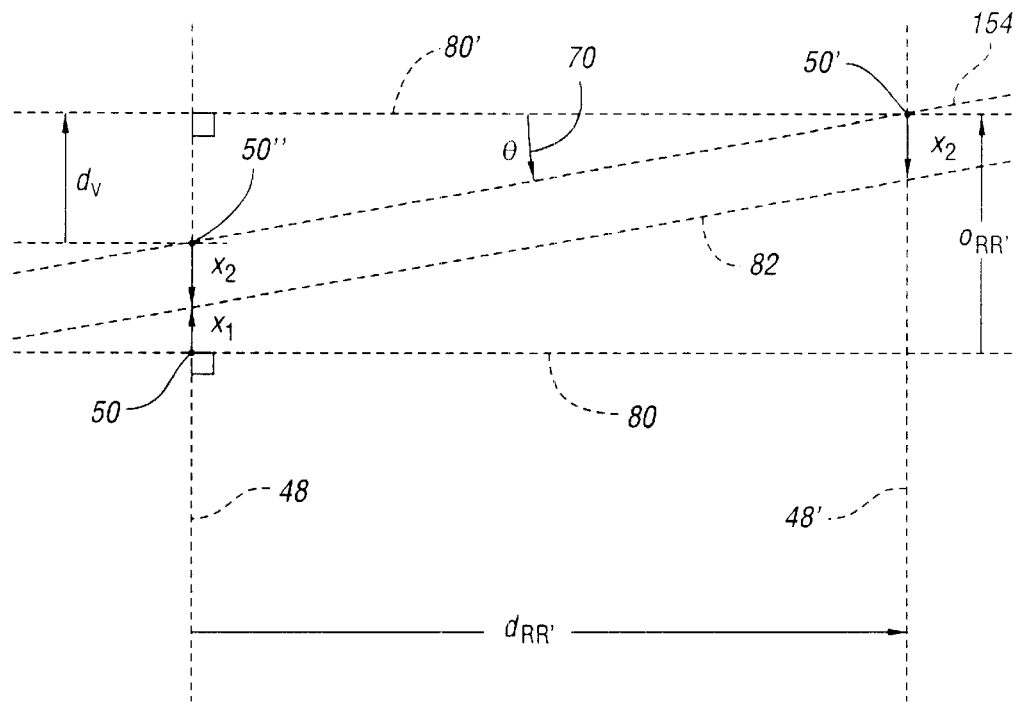
FIG. 11 is a diagram illustrating the trigonometric relationships associated with the offset between read modules.

Referring now to FIG. 11 with continued reference to FIG. 10, the trigonometric relationships associated with the offset between read modules is shown. The displacements $x_1$ and $x_2$ are measured parallel to read head axes 48,48' with the positive direction towards the top of the figure. In the example shown, $x_1$ is positive and $x_2$ is negative. Servo read element 50'' represents the location of servo read element 50' projected along line 154 parallel to servo stripe axis 82 from head axis 48' onto head axis 48. The offset from 50'' to 50' is represented by $d_V$ in accordance with Equation 7:

$$d_V = d_{RR'} \tan \theta \quad (7)$$

where $d_{RR'}$ is positive as shown and, thus, equal to $l_{RR'}$ for the illustrated example.

The servo read element offset, $o_{RR'}$, from servo read element 50 to servo read element 50' in the direction parallel to read axes 48,48', is represented by the sum of three displacements illustrated on read axis 48. The servo read element offset is expressed in Equation 8:

$$o_{RR'} = x_1 - x_2 + d_V \quad (8)$$
$$= x_1 - x_2 + d_{RR'}\tan\theta$$
$$\approx x_1 - x_2 + d_{RR'}\theta$$

Figure 12:
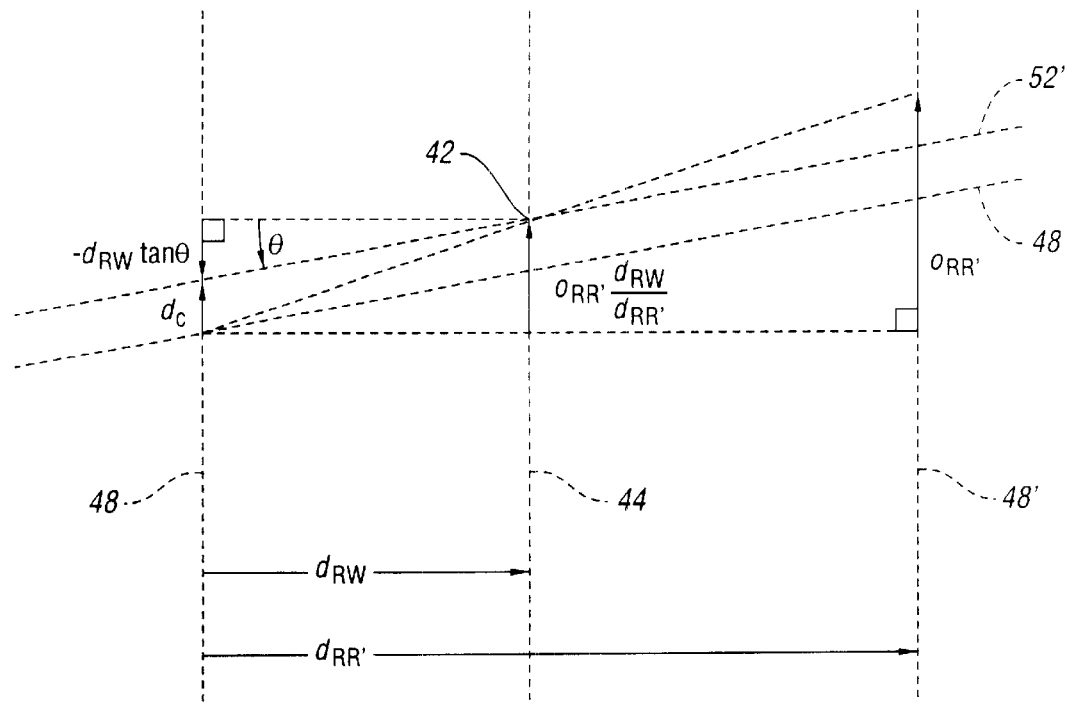
FIG. 12 is a diagram illustrating the trigonometric relationships associated with positioning the write module to compensate for the offset between read modules.

Referring now to FIG. 12 with continued reference to FIGS. 10 and 11, the trigonometric relationships associated with positioning the write module to compensate for the offset between read modules is shown. Head control 54 may use offset $o_{RR'}$ to more accurately position write element 42 relative to write track 28 if it is assumed that the ratio of the offset between write module 38 and read module 40 to the offset between read modules 40,40' is in proportion to the ratio of the distance between write axis 44 and servo read axis 48 to the distance between servo read axes 48 and 48'. Head control 54 calculates correction displacement $d_C$ by summing the corrections due to skew as described with regard to Equation 5 above and due to the estimated offset of write module 38 relative to read module 40. The correction displacement is expressed by Equation 9:

$$d_C = o_{RR'}\frac{d_{RW}}{d_{RR'}} - d_{RW}\tan\theta \quad (9)$$
$$\approx o_{RR'}\frac{d_{RW}}{d_{RR'}} - d_{RW}\theta$$

Head control 54 then generates positioning signal 56 based on correction displacement $d_C$ for head position servo 26. Head position servo 26 responds to positioning signal 56 by moving tape head 22 relative to tape 24 as indicated by data track 28', thus moving data track axis 52 to 52' centered on write element 42.

Figure 13:
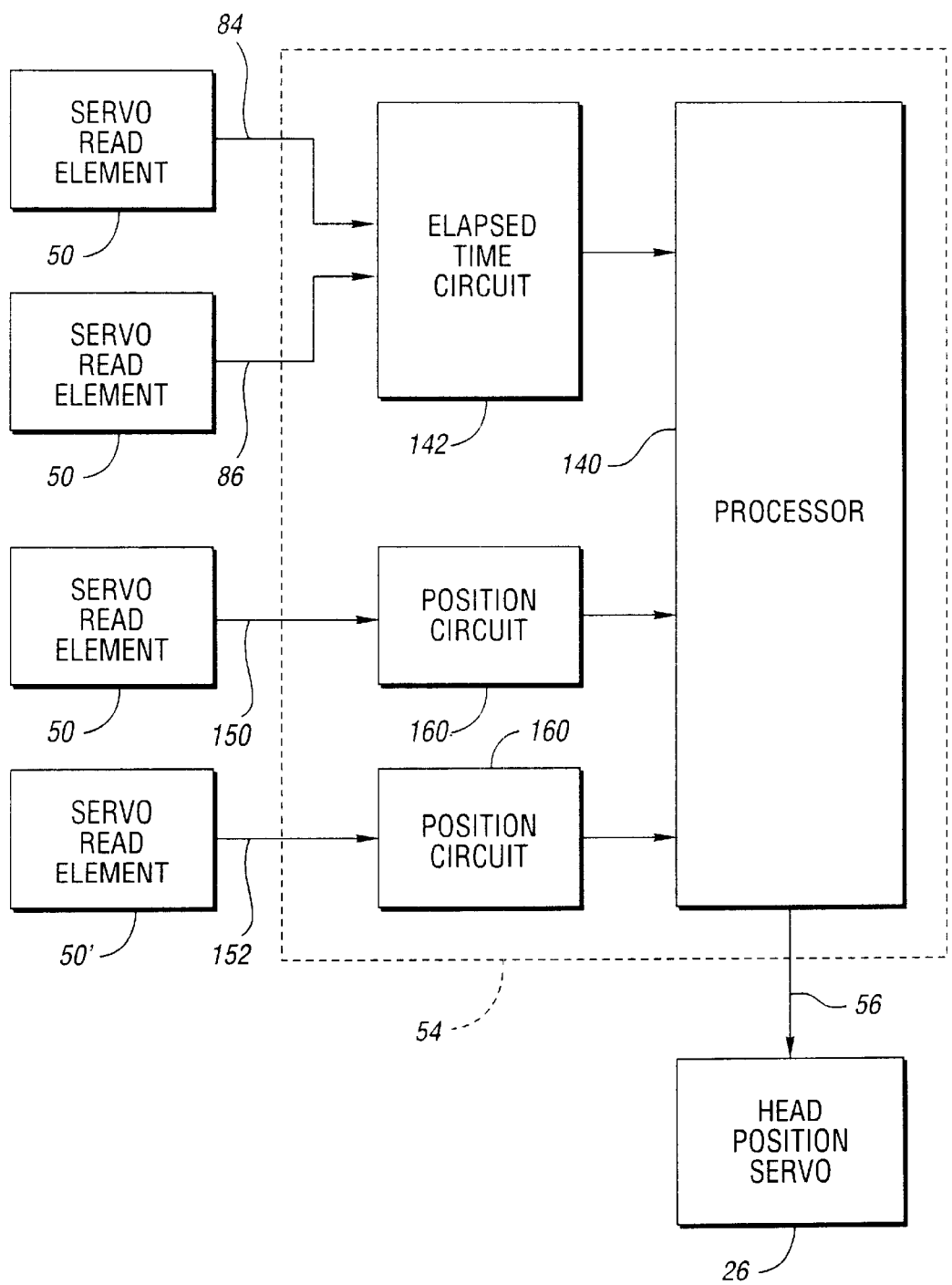
FIG. 13 is a block diagram of a system for determining module offset according to an embodiment of the present invention.

Referring now to FIG. 13, a block diagram of a system for determining module offset according to an embodiment of the present invention is shown. Elapsed time circuit 142 accepts first servo read signal 84 and second servo read signal 86 from servo read elements 50 and produces a count proportional to the difference in time between when corresponding synchronization fields 32 cross servo read elements 50. Processor 140 uses the count produced by elapsed time circuit 142 and the proper sign to calculate skew angle 70. A discussion of skew angle calculation is provided with regard to FIGS. 2–8 above. Each position circuit 160 accepts tracking pattern signal 150,152 from servo read element 50,50' and determines the offset of tape 24 relative to servo read element 50,50'. Implementations for position circuit 160 are well known to one of ordinary skill in the art. One implementation that may be used for position circuit 160 is described in U.S. Pat. No. 5,898,533 titled "Tape Servo Pattern With Embedded Servo Track Number Identification" to J. Mantey et al., which is incorporated by reference herein. Processor 140 then calculates correction displacement $d_C$ as described with regard to FIGS. 10–12 above. Processor 140 generates positioning signal 56 based on correction displacement $d_C$ for use by head position servo 26.

Figure 14:
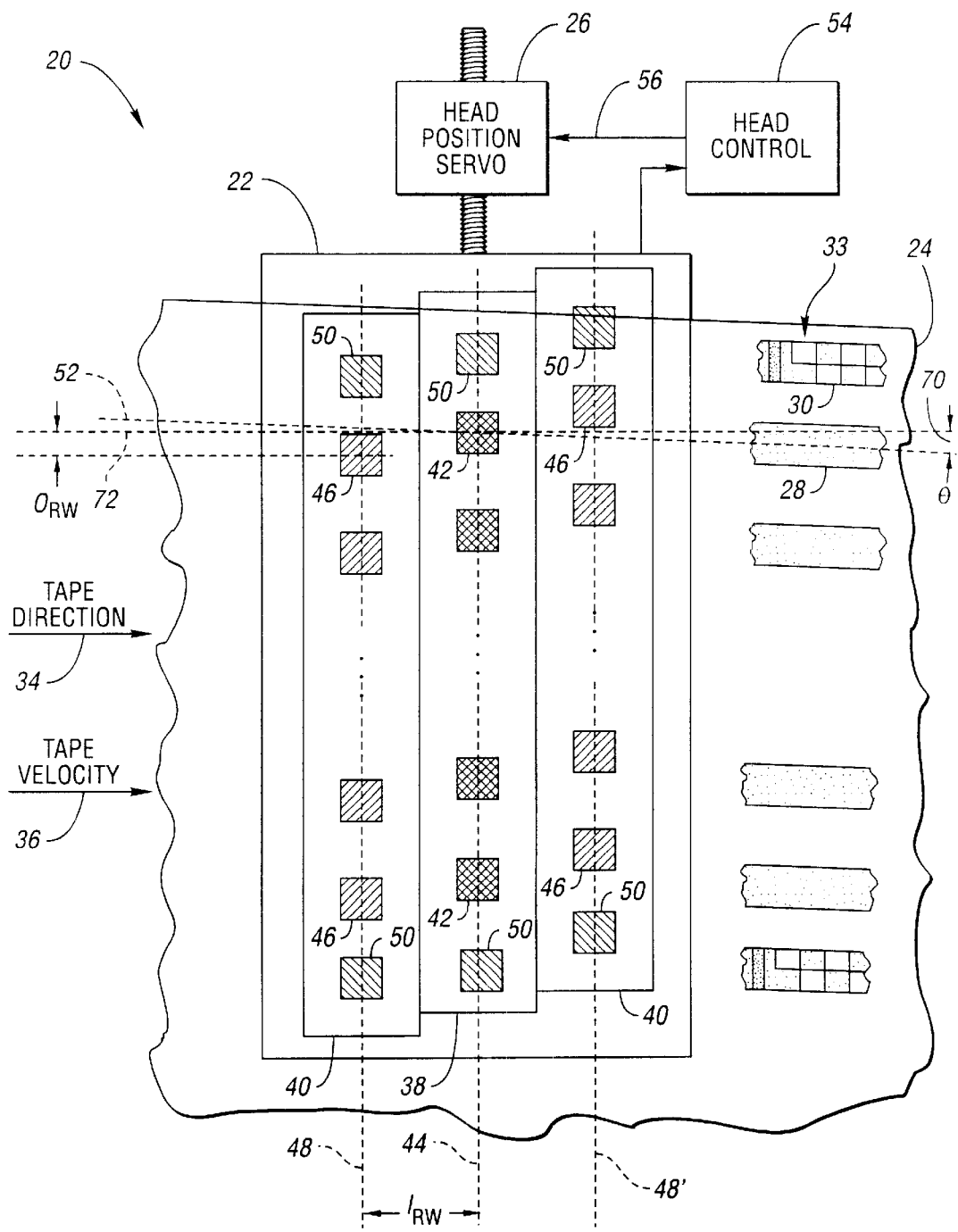
FIG. 14 is a diagram illustrating skewed tape traveling across a read-write-read head having module offsets wherein the write module includes servo read elements according to an embodiment of the present invention.

Referring now to FIG. 14, a diagram illustrating skewed tape traveling across a read-write-read head having module offsets wherein the write module includes servo read elements according to an embodiment of the present invention is shown. Write module 38 is constructed to include one or more servo read elements 50 centered on write element axis 44. The offset of write module 38 relative to read module 40 in a direction parallel with write element axis 44, indicated by $o_{RW}$, can be directly determined as described with regards to FIG. 15 below. Write modules including servo read elements are known to those skilled in the art of tape head design.

Figure 15:
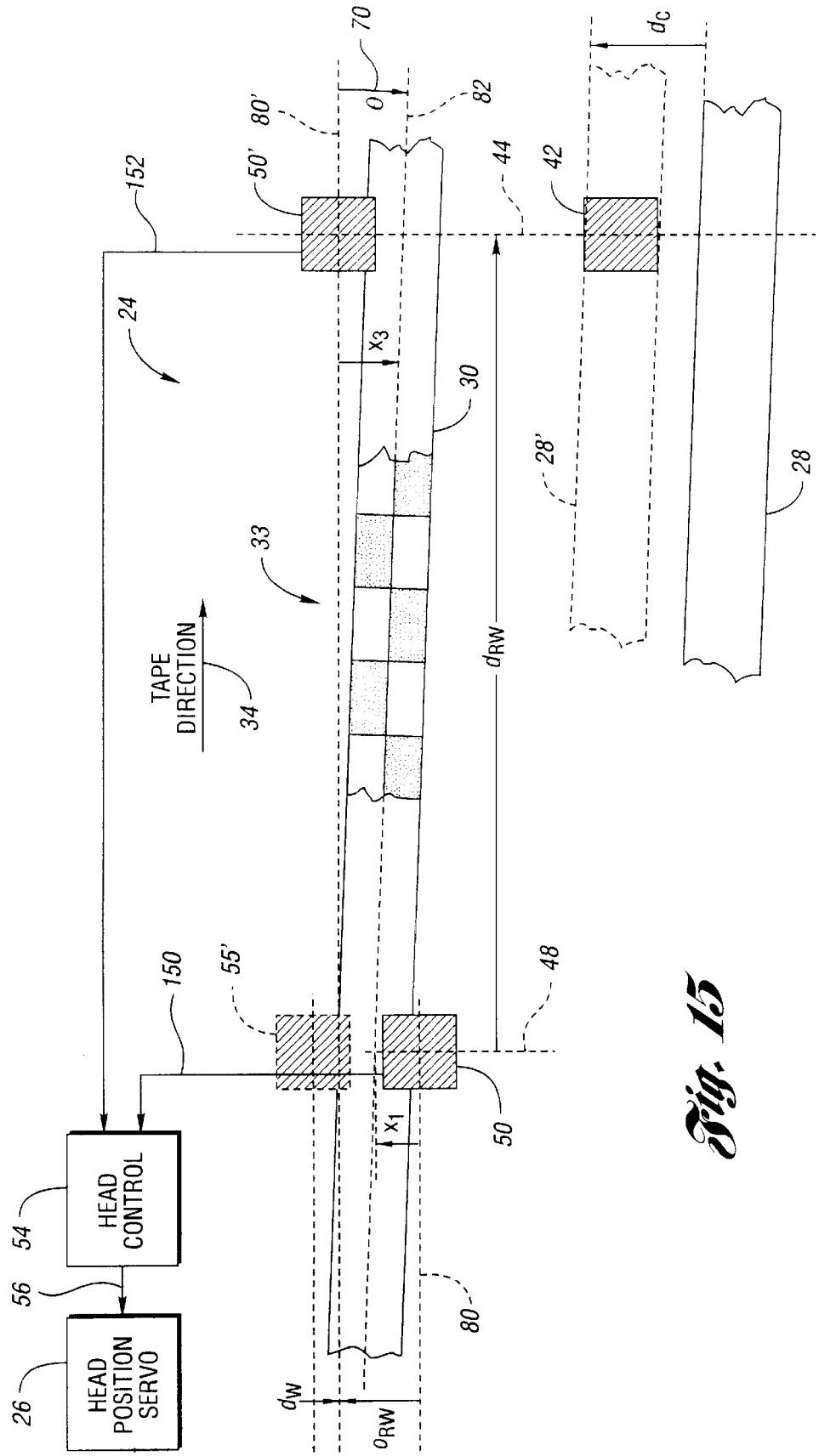
FIG. 15 is a diagram illustrating write module offset calculation according to an embodiment of the present invention wherein the write module includes a servo read element.

Referring now to FIG. 15, a diagram illustrating write module offset calculation according to an embodiment of the present invention wherein the write module includes a servo read element is shown. Calculating the offset for tape head 22 to align data track 28 over write head 42 is similar to the calculations described with regards to FIGS. 9–12 above. Servo read element 50 in read module 40 and servo read element 50' in write module 38 are positioned to read the same servo stripe 30. Head control 54 detects tracking pattern 33 passing by servo read element 50 based on first tracking pattern signal 150 received from servo read element 50. Head control 54 determines the offset from servo read element 50 to servo stripe axis 82, indicated by $x_1$, based on first tracking pattern signal 150. Similarly, head control 54 detects tracking pattern 33 passing by servo read element 50' using second tracking pattern signal 170 from servo read element 50'. Head control 54 determines the offset from servo read element 50' to servo stripe axis 82, indicated by $x_3$, based on second tracking pattern signal 170.

The displacements $x_1$ and $x_3$ are measured parallel to the read and write head axes 48 and 44, respectively, with the positive direction being toward the top of the figure. In the example shown, $x_1$ is positive and $X_3$ is negative. Servo element 50" represents the location of servo read element 50' projected along a line parallel to servo stripe axis 82 from write head axis 44 onto read head axis 48. The offset from 50" to 50' is represented by $d_W$ in accordance with Equation 10:

$$d_W = d_{RW} \tan\theta \quad (10)$$

where $d_{RW}$ is positive as shown and, thus, equal to $l_{RW}$ for the illustrated example.

The offset from servo read element 50 to servo read element 50' in the direction parallel to head axis 48,44 is $o_{RW}$. The offset $o_{RW}$ may be represented as the sum of the three displacements $d_W$, $x_1$, and $x_3$. This permits $o_{RW}$ to be expressed as Equation 11:

$$o_{RW} = x_1 - x_3 + d_W \quad (11)$$
$$= x_1 - x_3 + d_{RW}\tan\theta$$
$$\approx x_1 - x_3 + d_{RW}\theta$$

Skew angle $\theta$ 70 and offsets $x_1$ and $x_3$ are functions of time and are primarily dependent of the position and skew of tape 24 at the time of measurement. Typically, it is not possible to operate servo read element 50' on write module 38 at the same time write element 42 is in operation. Therefore, write head offset $o_{RW}$ may be estimated during a drive calibration process. Once measured, $o_{RW}$ is maintained in memory within head control 54 and used when needed to produce positioning signal 56.

Head control 54 can calculate correction distance, $d_C$, required to move write element 42 over data track 28. The correction distance $d_C$ is the sum of the correction due to skew angle 70, as described with regard to FIG. 3 above, and the correction due to the offset of write module 38 with respect to read module 40. An expression for the correction distance is provided in Equation 12:

$$d_C = o_{RW} - d_{RW} \tan \theta \approx o_{RW} - d_{RW} \theta \qquad (12)$$

As described above, head position servo 26 receives positioning signal 56 and moves head 22 relative to tape 24 to better position write element 42 over data track 28 as indicated by 28'.

The system illustrated in FIG. 13 may be used to calculate the correction distance described in FIG. 15 with minor modifications. First, servo read element 50' producing second tracking pattern signal 170 replaces servo read element 50' producing second tracking pattern signal 152. Also, processor 140 is modified to carry out the calculations described with regard to Equations 10–12 above.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A system for measuring position error of a magnetic tape, the magnetic tape having a plurality of data tracks and a plurality of servo stripes across the tape width, each servo stripe of the plurality of servo stripes having a periodically spaced sequence of synchronization fields and tracking patterns, each particular synchronization field of the plurality of synchronization fields in any servo stripe aligned across the width of the tape with a corresponding synchronization field in any other servo stripe of the plurality of servo stripes, the system comprising:

a multiple module tape head comprising at least one read module and at least one write module for accessing the magnetic tape moving at a tape speed in a tape direction past the tape head, each write module of the at least one write module comprising at least one write element for writing data on the magnetic tape and the at least one read module comprising at least two servo read elements operative to detect the synchronization fields; and a head control in communication with a first servo read element on the at least one read module and a second servo read element on the at least one read module located a fixed distance from the first read element, the head control operative to
   (a) detect the presence of one of the particular synchronization fields passing the first servo read element,
   (b) detect the presence of the corresponding synchronization field passing the second servo read element,
   (c) determine an elapsed time between the detected particular synchronization field and the corresponding synchronization field, and
   (d) determine tape skew based on the determined elapsed time, the fixed distance between the first servo read element and the second servo read element, and the tape speed.

2. A system for measuring position error of a magnetic tape as in claim 1 wherein the at least one read module is at least two read modules, a servo read element in a first read module and a servo read element in a second read module aligned such that when the first read module servo read element is reading a particular servo stripe the second read module servo read element is reading the same particular servo stripe, the head control further operable to:

detect a first tracking pattern on the particular servo stripe passing the first read module servo read element;
   determine a first offset as the tape offset relative to the first read module servo read element based on the detected first tracking pattern;
   detect a second tracking pattern on the particular servo stripe passing the second read module servo read element;
   determine a second offset as the tape offset relative to the second read module servo read element based on the detected second tracking pattern; and
   determine the second read module offset relative to the first read module based on the determined skew, the first offset, and the second offset.

3. A system for measuring position error of a magnetic tape as in claim 2 wherein the head controller is further operable to estimate the offset of each of the at least one write module relative to the first read module based on the determined offset of the second read module relative to the first read module and a distance between the first read module and the at least one write module.

4. A system for measuring position error of a magnetic tape as in claim 1 wherein the at least one write module further comprises at least one servo read element, a servo read element in one of the at least one read module and a servo read element in the at least one write module aligned such that when the read module servo read element is reading a particular servo stripe the write module servo read element is reading the same particular servo stripe, the head control further operable to:

detect a first tracking pattern on the particular servo stripe passing the read module servo read element;
   determine a first offset as the tape offset relative to the read module servo read element based on the detected first tracking pattern;
   detect a second tracking pattern on the particular servo stripe passing the write module servo read element;
   determine a second offset as the tape offset relative to the write module servo read element based on the detected second tracking pattern; and
   determine the write module offset relative to the read module based on the determined skew, the first offset, and the second offset.

5. A tape deck for accessing a magnetic tape, the magnetic tape having a plurality of data tracks and a plurality of servo stripes across the tape width, each servo stripe of the plurality of servo stripes having a periodically spaced sequence of synchronization fields and tracking patterns, each particular synchronization field of the plurality of synchronization fields in any servo stripe aligned across the width of the tape with a corresponding synchronization in any other servo stripe of the plurality of servo stripes, the system comprising:

a multiple module tape head comprising at least one read module and at least one write module for accessing the magnetic tape moving at a tape speed in a tape direction past the tape head, each write module of the at least one write module comprising at least one write element for writing data on the magnetic tape and the at least one read module comprising at least two servo read elements operative to detect the synchronization fields;
   means for positioning the tape head across the width of the magnetic tape in response to a positioning signal, the tape head position aligning at least one write element with an appropriate data track; and
   a head control in communication with a first servo read element on the at least one read module and a second servo read element on the at least one read module located a fixed distance from the first read element, the head control operative to (a) detect the presence of one of the particular synchronization fields passing the first servo read element,
(b) detect the presence of the corresponding synchronization field passing the second servo read element,
(c) determine an elapsed time between the detected particular synchronization field and the corresponding synchronization field,
(d) determine tape skew based on the determined elapsed time, the fixed distance between the first servo read element and the second servo read element, and the tape speed, and
(e) generate the positioning signal based on the determined skew.

6. A tape deck for accessing a magnetic tape as in claim 5 wherein the at least one read module is at least two read modules, a servo read element in a first read module and a servo read element in a second read module aligned such that when the first read module servo read element is reading a particular servo stripe the second read module servo read element is reading the same particular servo stripe, the head control further in communication with the first read module servo read element and the second read module servo read element, the head control further operable to:

detect a first tracking pattern on the particular servo stripe passing the first read module servo read element;
determine a first offset as the tape offset relative to the first read module servo read element based on the detected first tracking pattern;
detect a second tracking pattern on the particular servo stripe passing the second read module servo read element;
determine a second offset as the tape offset relative to the second read module servo read element based on the detected second tracking pattern; and
determine the second read module offset relative to the first read module based on the determined skew, the first offset, and the second offset.

7. A tape deck for accessing a magnetic tape as in claim 6 wherein the head controller is further operable to:

estimate the offset of each of the at least one write module relative to the first read module based on the determined offset of the second read module relative to the first read module and a distance between the first read module and the at least one write module; and
generate the positioning signal further based on the determined offset of the at least one write module.

8. A tape deck for accessing a magnetic tape as in claim 5 wherein the at least one write module further comprises at least one servo read element, a servo element in one of the at least one read module and a servo element in the at least one write module aligned such that when the read module servo read element is reading a particular servo stripe the write module servo read element is reading the same particular servo stripe, the head control further operable to:

detect a first tracking pattern on the particular servo stripe passing the read module servo read element;
determine a first offset as the tape offset relative to the read module servo read element based on the detected first tracking pattern;
detect a second tracking pattern on the particular servo stripe passing the write module servo read element;
determine a second offset as the tape offset relative to the write module servo read element based on the detected second tracking pattern;
determine the write module offset relative to the read module based on the determined skew, the first offset, and the second offset; and generate the positioning signal further based on the determined offset of the at least one write module.

9. A method for determining position error of a magnetic tape as the tape passes a tape head in a tape direction and at a tape speed, the magnetic tape having a plurality of data tracks and a plurality of servo stripes across the tape width, each servo stripe of the plurality of servo stripes having a periodically spaced sequence of synchronization fields and tracking patterns, each particular synchronization field of the plurality of synchronization fields in any servo stripe of the plurality of servo stripes aligned across the width of the tape with a corresponding synchronization field of the sequence of synchronization fields in any other servo stripe of the plurality of servo stripes, the method comprising:

detecting the presence of one of the particular synchronization fields passing a first servo read element in a particular read module in the tape head;
detecting the presence of the corresponding synchronization field passing a second servo read element in the particular read module in the tape head;
determining an elapsed time between the detected particular synchronization field and the detected corresponding synchronization field; and
determining tape skew based on the determined elapsed time and the tape speed.

10. A method for determining position error of a magnetic tape as in claim 9 further comprising:

detecting a first tracking pattern on a particular servo stripe passing a first read module servo read element;
determining a first offset as the tape offset relative to the first read module servo read element;
detecting a second tracking pattern on the particular servo stripe passing a second read module servo read element;
determining a second offset as the tape offset relative to the second read module servo read element; and
determining the second read module offset relative to the first read module based on the determined skew, the first offset, and the second offset.

11. A method for determining position error of a magnetic tape as in claim 10 further comprising determining the offset of a write module in the tape head relative to the first read module based on the determined offset along the tape width of the second read module relative to the first read module, the distance between the first read module and the second read module, and a distance between the first read module and the write module.

12. A method for determining position error of a magnetic tape as in claim 9 wherein the at least one write module further comprises a servo read element, the method further comprising:

detecting a first tracking pattern on a particular servo stripe passing a read module servo read element;
determining a first offset as the tape offset relative to the read module servo read element based on the detected first tracking pattern;
detecting a second tracking pattern on the particular servo stripe passing a write module servo read element;
determine a second offset as the tape offset relative to the write module servo read element based on the detected second tracking pattern; and
determine the write module offset relative to the read module based on the determined skew, the first offset, and the second offset.

* * * * *